United States Patent
Solh et al.

(10) Patent No.: US 9,548,048 B1
(45) Date of Patent: Jan. 17, 2017

(54) ON-THE-FLY SPEECH LEARNING AND COMPUTER MODEL GENERATION USING AUDIO-VISUAL SYNCHRONIZATION

(71) Applicant: Amazon Technologies, Inc., Seattle, WA (US)

(72) Inventors: Mashhour Solh, San Jose, CA (US); Krishna Kamath Koteshwara, San Jose, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 14/745,248

(22) Filed: Jun. 19, 2015

(51) Int. Cl.
*G10L 15/04* (2013.01)
*G10L 15/06* (2013.01)
*G10L 15/24* (2013.01)

(52) U.S. Cl.
CPC .......... *G10L 15/063* (2013.01); *G10L 15/24* (2013.01)

(58) Field of Classification Search
CPC .... H04N 21/4307; H04N 5/04; H04N 21/242; H04N 21/23418; H04N 21/4302; H04N 7/56; G10L 15/26; G10L 15/00; G10L 15/265; G10L 15/187; G10L 2015/025; G10L 15/06; G10L 15/25; G10L 13/00; G10L 13/033; G10L 19/00; G10L 19/0017; G10L 19/018; G10L 2021/0135; G10L 21/055; G10L 25/00; G10L 25/57; G10L 15/183; G10L 15/30; G10L 2015/228
USPC ..... 704/1–10, 251, 255, 257, 270, 243–245, 704/260; 370/252; 348/515
IPC .............. G10L 13/00, 13/033, 19/00, 19/0017, 19/018, 2021/0135, 21/055, 25/00, 25/57, 15/183, 15/187, 15/30, 2015/228
See application file for complete search history.

(56) References Cited

U.S. PATENT DOCUMENTS

| 6,839,672 B1* | 1/2005 | Beutnagel | G10L 21/06 704/260 |
| 2008/0056145 A1* | 3/2008 | Woodworth | H04N 7/147 370/252 |
| 2010/0332229 A1* | 12/2010 | Aoyama | G06K 9/00221 704/251 |

(Continued)

OTHER PUBLICATIONS

Hassanat, A., "Visual Words for Automatic Lip-Reading," doctoral thesis, The University of Buckingham, Department of Applied Computing, United Kingdom, Dec. 2009, 204 pages.

(Continued)

*Primary Examiner* — Huyen Vo
(74) *Attorney, Agent, or Firm* — Davis Wright Tremaine LLP

(57) ABSTRACT

A speech recognition computer system uses video input as well as audio input of known speech when the speech recognition computer system is being trained to recognize unknown speech. The video of the speaker can be captured using multiple cameras, from multiple angles. The audio can be captured using multiple microphones. The video and audio can be sampled so that timing of events in the video and audio can be determined from the content independent of an audio or video capture device's clock. Video features, such as a speaker's moving body parts, can be extracted from the video and random sampled, to be used in a speech modeling process. Audio is modeled at the phoneme level, which provides word mapping with minor additional effort. The trained speech recognition computer system can then be used to recognize speech text from video/audio of unknown speech.

18 Claims, 8 Drawing Sheets

(56) References Cited

U.S. PATENT DOCUMENTS

2012/0120314 A1* 5/2012 Yang .................... H04N 17/004
 348/515
2015/0049248 A1* 2/2015 Wang .................... H04L 65/602
 348/512

OTHER PUBLICATIONS

Chitu, A.G., and L.M. Rothkrantz, "Visual Speech Recognition, Automatic System for Lip Reading of Dutch," Information Technologies and Control, Mar. 2009, 8 pages.

Wolff, G.J., et al., "Lipreading by Neural Networks: Visual Preprocessing, Learning and Sensory Integration," Wolff, Prasad, Stork, and Hennecke, 8 pages.

* cited by examiner

…

ON-THE-FLY SPEECH LEARNING AND COMPUTER MODEL GENERATION USING AUDIO-VISUAL SYNCHRONIZATION

BACKGROUND

Speech recognition typically refers to a process whereby an appropriately programmed computer system or circuit can receive an input in the form of speech, such as an audio recording, and output text data that corresponds to the words being spoken in the input representation. Speech recognition might involve determining, guessing, and/or estimating what words a speaker is speaking when the words being spoken are not known to the computer system. Speech recognition is useful for creating captioning for video, making recorded audio and video keyword searchable by the words spoken in the recording, automated transcription, and other uses. Typically, a speech recognition system has a stored model of speech that it uses to assess what words might have been spoken and to resolve the input speech into the words that were spoken. Typically, that stored model is generated using some speech learning process.

Speech learning describes a process in which a computer system processes a recording of a speaker, knowing the words that the speaker is speaking, and builds a computer model that can be used for speech recognition and similar tasks. The processing is sometimes referred to as a training process. Once a computer system is "trained," that computer system might be expected to convert spoken speech into text data or other representation of sequences of words. Speech learning is useful in making speech recognition more accurate, more efficient, and the like.

Audio systems, commonly used in the art, generally require speech recognition training, speech learning, or other types of teachings in order for the audio system to function adequately. Such systems may require many forms of training for each different user before being deployed and available for use, which requires a mass of data collection such as batch training, where a new user speaks a known sequence, and a system analyzes that to determine phonemes and accents.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include speech learning that uses video of a speaker speaking, as well as audio of the speaker speaking in creating a stored model of speech that is usable for speech recognition. These methods might be used in training a speech recognition computer system so that it can correctly model predictions of speech. In using a combination of the video input of a speaker speaking and audio of that speaker speaking, the audio and video might be processed to synchronize the audio and the video. This synchronizing might be performed even with audiovisual recordings that purport to have their audio stream and their video stream already time-aligned.

In some aspects, visual preprocessing is performed to distill, from video frames, the edges of a speaker's eyes and lips (or other body parts) so that edge information can be used as an input to a speech learning computer system. The edge information might be generated by maximally sampling edges that are detected, or the edge information might be down-sampled or random sampled so that automated line fitting could be done. In some example embodiments, borders of the facial features or body elements may be detected based at least in part on the edge information. For example, the borders of the speaker's lips may be determined based on the upper edges and lower edges of the speaker's lips. The video input might include video from multiple camera angles to improve the random sampling.

The speech learning could be done at the phoneme level rather than the word level, so that the model of speech can be used in situations having varying dialects and other conditions where phoneme level speech recognition is preferable.

Example embodiments include a method, system, and computer-readable medium configured for on-the-fly training of speech recognition systems using lip reading, lip-synching, audio recording, and other facial movements (e.g., eye movements) based on a 360° video system to train a speech recognition platform to learn speech recognition in real time, without prior training.

Figure 1:
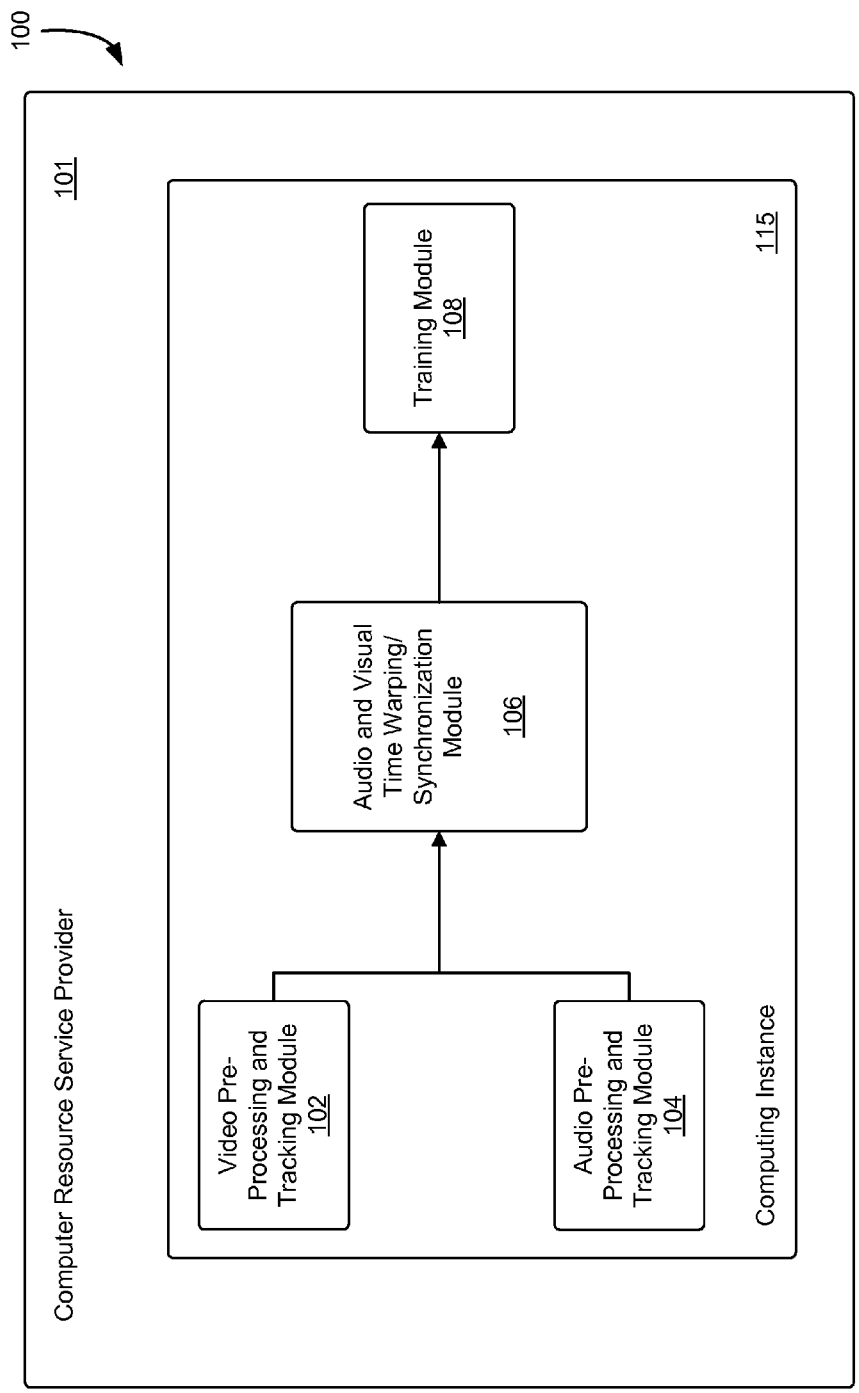
FIG. 1 is an illustrative example of block diagram illustrating an on-the-fly speech recognition system in accordance with at least one embodiment.

FIG. 1 is an illustrative example of block diagram 100 illustrating an on-the-fly speech recognition system in accordance with at least one embodiment. The on-the-fly speech recognition system may include visual preprocessing systems 102, audio preprocessing systems 104, audio and visual time synchronization systems 106, training systems 108, and an application (not shown) used in combination or partial combination for automatic data collection and training of a machine-learning model for audio-visual lip-reading and lip-synching.

Example embodiments of the system may be configured to facilitate automated self-training processes for wide variety of visual speech applications such as visual lip-reading, automated lip-synching, smarter speech recognition engines, time accurate personalized Karaoke, etc. The systems or modules 102, 104, 106, and/or 108 or modules are configured for video and audio processing in order to extract, synchronize, process, and train the machine-learning model used to train and create the on-the-fly speech recognition system. The system, for example, may use hardware architecture compromising a far field microphone array system (e.g., Echo) and one or more wide-angel, high-resolution cameras 360-cameras. Or any similar hardware with audio-visual captures capability.

A computing resource service provider 101 may be a service, such as a web service and/or some other such computing resource service that may manage content, access, policies, users, and/or other such computer system resources for a computer system resource such as a directory service, a web service, and/or some other such computer system resource. The computer system resources that are managed by the computing resource service may be referred to herein as resources, computer system resources, content, assets, and/or other such terms.

The computing resource service provider 101 may further provide access to one or more host machines as well as provide access to computer services such as virtual machine (VM) instances, automatic scaling groups, file-based database storage systems, block storage services, redundant data storage services, data archive services, data warehousing services, user access management services, content management services and/or other such computer system services as may be running thereon. The computing resource service provider 101 may also provide access to computer system resources such as user resources, policy resources, network resources and/or storage resources. In some distributed and/or virtualized computer system environments, the resources associated with the computer services may be physical devices, virtual devices, combinations of physical and/or virtual devices or other such device embodiments.

In alternative example embodiments, the system illustrated in FIG. 1 may be implemented in a distributed system that implements a platform for providing computing resources that are configurable and scalable to meet various types of computing needs. A computing resource service provider may be configured to share relatively large amounts of computing resources and can be distributed among a large number of users, and may include multiple computing components with configurable resources. In some embodiments, a distributed file system utilized by the computing resource service provider in providing services may also dynamically reallocate resources on demand. Distributed tasks benefit greatly from the scalability of the computing resource service provider because they can quickly be scaled up or down to use resources based on the customer's needs.

The computing instance 115 may comprise components capable of performing computational tasks, and includes both hardware components such as servers and software components such as virtual machine instances. Compute instances (e.g., nodes, servers, hosts, etc.) may contain a combination of both hardware and software components. A typical example of a computing instance may be a node as a part of multiple instances, such as a compute group. The compute group may include multiple servers, each server capable of running one or more virtual machine instances which in turn are capable of running one or more computational tasks.

A virtual machine instance contains an operating system (e.g., Linux) and data needed to launch a virtual machine in a virtual environment. The virtual machine instance may include a file system, the operating system and other components needed to boot up as a computer. In order to launch a virtual machine, hardware needs to be selected. The hardware selection may be accomplished through instance types, which may allow a variety of different sizes of memory, CPU performance, GPU performance, storage capacity, and other characteristics. The combination of the virtual machine instance and the instance type can be used to create an "instance" or a virtual machine, which may be launched on a computing resource, such as a host server computer in a multi-tenant network environment (i.e., a computing environment where different virtual machines are managed by different customers and, in some embodiments, where individual hardware computer systems are used to implement virtual machines for multiple customers). The computing instance 115 may include a video pre-processing and tracking module 102 and an audio pre-process and tracking module 104 configured to record and/or processing recordings (described in more detail in connection with FIGS. 2 and 3).

Figure 2:
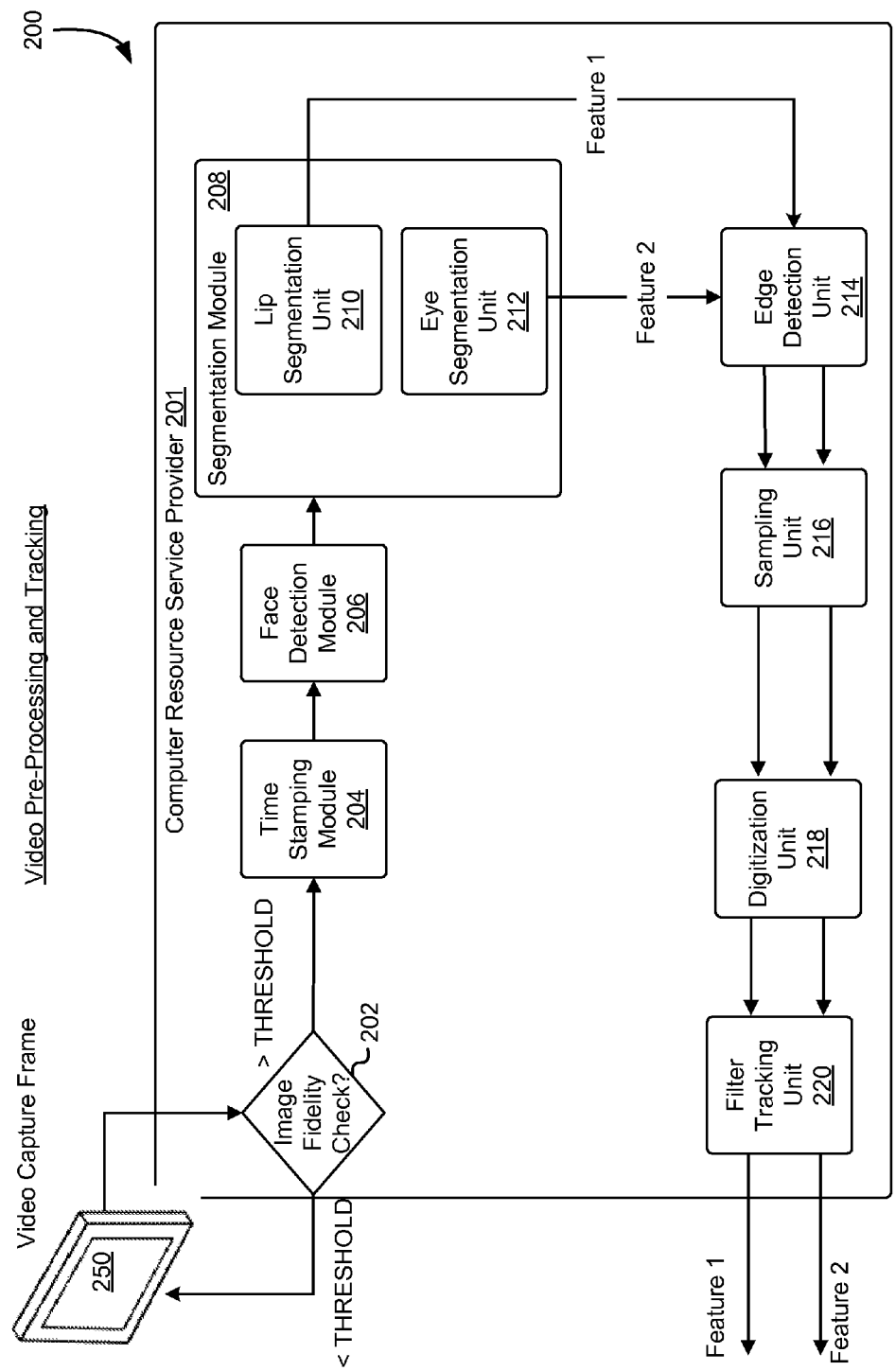
FIG. 2 is an illustrative example of a block diagram illustrating video pre-processing and tracking in accordance with at least one embodiment.

FIG. 2 is an illustrative example of a block diagram 200 illustrating video pre-processing and tracking in accordance with at least one embodiment. As illustrated in FIG. 2, the computing resource service provider (201) may include a video pre-processing and tracking system may include a video capture frame (250), an image fidelity check function (202), a time stamping module (204), a face detection module (206), a segmentation module (208), an edge detection unit (214), a sampling unit (216), a digitization unit (218), and a filter tracking unit (220).

A computing resource service provider 201 may be a service, such as a web service and/or some other such computing resource service that may manage content, access, policies, users, and/or other such computer system resources for a computer system resource such as a directory service, a web service, and/or some other such computer system resource. The computer system resources that are managed by the computing resource service may be referred to herein as resources, computer system resources, content, assets, and/or other such terms.

The computing resource service provider 201 may further provide access to one or more host machines as well as provide access to computer services such as virtual machine (VM) instances, automatic scaling groups, file-based database storage systems, block storage services, redundant data storage services, data archive services, data warehousing services, user access management services, content management services and/or other such computer system services as may be running thereon. The computing resource service provider 201 may also provide access to computer system resources such as user resources, policy resources, network resources and/or storage resources. As described herein, the deployment of the computing resource is specified by a provisioning policy (such as a deployment of updated information, resources, or bringing additional host servers or other components online), or other such policy used for updating, upgrading, or otherwise changing resources and/or servers of a network. The deployment of the computing resource includes the configuration of the computing resources, such as the video pre-processing and tracking system, the audio pre-processing and tracking system, and/or the audio and visual time-warping/synchronization system, within a computing environment and the interaction of the computing resource with said environment. The configuration may set forth or prescribe the utilization of the computing instance of the resources of the computing environment.

In some distributed and/or virtualized computer system environments, the resources associated with the computer services may be physical devices, virtual devices, combinations of physical and/or virtual devices or other such device embodiments. In some embodiments, the host machines, such as host servers (frontend/backend servers), may be physical machines located within the computer system environment. In some embodiments, the host machines may be guest virtual machines operating on physical machines located within the computer system environment.

Example embodiments employ a video capture frame 250, such as a video channel, video camera, etc., to perform speech analysis in combination with an audio capture unit to capture audio, where the video analysis may be used to determine what the audio is stating and/or the audio analysis may be overlaid with the video in order to match corresponding facial movements with different phonemes.

Visual pre-processing and tracking may be implemented in order to compile, and ultimately segment, different visual cues related to facial movements. The recorded facial movements may provide an overall impression of motion; for example, determining, in the video capture, the location of the lips and/or eyes and the motions (e.g., open mouth, closed eyes) that are made during different portions of a corresponding audio recording. The time stamping module 204 may receive time stamp information from the video capture frame processor, and, using the time stamp on the audio file and the video file received from the video capture frame 250 in order to ensure the times overlap, such that the video recording is played in-synch with the audio recording.

The recordation times might be derived from the video and/or the audio that represent the time that speaking is occurring, which might be different than the media time present on the recorded media. The difference between the two might be caused by audio delays between the speaker speaking and a microphone capturing sound and providing it to a microphone input, or in some processing delays. Thus, for video, there is a video recordation time, indicative of the live time the speaker is speaking, at a camera input or at some other point in the processing of video, and the video media time, represented in the stored video as a time stamp or time code or the like. A time stamp or time code of a video may include time stamp information (e.g., metadata), such as characters and/or encoded information identifying when a certain event occurred (e.g., date, time, etc.). Where there is no significant processing delay for video, the light traveling time can be ignored, so the video recordation time might be essentially equal to the video media time. The audio recordation time would also be indicative of the live time the speaker is speaking, and the audio media time would be the time that an audio time stamp is recorded. Differences with audio can be due to processing times and propagation times. The times between video and audio might also differ, due to lack of clock sync, clock drift, or other reasons.

In the general case, embodiments may compare a recordation time of a user or speaker action with a media time of the speaker action, with the recordation time indicating when the speaker action occurred and the media time indicating a time marking of media having recorded thereon a representation of the speaker action and may do this for multiple speaker actions. This can be used to scale the video or the audio based on differences in comparing the recordation times with the media times, aligning the video and the audio for use in modeling the audio and the video into the speech recognition model while taking into account variability of recording times. The user action may include a facial feature movement (e.g., the mouth moving to speak), a body feature or body element movement (e.g., hands moving), a period of silence without speaking, or other movements, shapes, changes, etc. in the user's body or face or associated features.

The video capture frame 250 may be evaluated for image fidelity in order to ensure the image is of high enough quality such that the speech recognition program can be most efficient. Image fidelity, for example, may be a measure of the accuracy of the reconstructed brightness distribution. A related metric, dynamic range, is a measure of the degree to which imaging artifacts around strong sources are suppressed, which in turn implies a higher fidelity of the on-source reconstruction. In some example embodiments, the video recording and/or video signal may be reviewed to ensure a high enough image quality. For example, a fidelity measurement of a video recording or image may be measured according to the camera capturing the user's face, body, and/or features with a determined level of acuity and a determined threshold of pixels/bits; such that a bounding box may be placed over the speaker's face and the fidelity check may be performed within that bounding box.

The fidelity check of the facial features and video recording generally may include, for example, determining a signal-to-noise ratio in the bound area (or other areas) plus a number of pixels/bits in the bounded area. For example, using a 4-mega pixel camera, a bounded box of the speaker's face may be a 40×40 pixel-bounding box. If the bounding box pixel size is too small, the processing of the video would be poor quality.

A segmentation module 208 may include video segmentation processing and analysis (including, for example, phase affection) of facial features determining points on edges of facial features in order to determine shapes formed by different elements (e.g., eyes, lips, tongue, etc.) of a user's face. The segmentation module includes a lip segmentation unit (210) and an eye segmentation unit (212). The lip segmentation unit (210) is used to recognize and segment lips and mouth features (feature 1) from the full face received from the video capture frame. Feature 1 is produced in response to the analysis performed by the lip segmentation unit, where feature 1 may include the profile or description in a mathematical method for describing the lip or mouth segment of the face as determined by the video capture. The eye segmentation unit (212) is configured to recognize and segment the eyes and eye areas (feature 2) from the full face received from the video capture frame. Feature 2 is produced in response to the analysis performed by the eye segmentation unit, where feature 2 may include the profile or description in a mathematical method for describing the eyes or eye area of the face as determined by the video capture.

The segmentation module 208 or a component operably interconnected therewith may include a logging component configured to log facial segmentation data. Example embodiments of the segmentation unit may include facial recognition algorithms to detect, determine, or estimate facial features in order to provide information for facial recognition tools to use with the speech recognition system described herein. For example, facial segmentation data may include features of a user's face identified in a video recording or a frame of a video recording, such as eyes, lips, nose, tongue, etc. The facial segmentation data may further include facial expressions, scale (e.g., distances between facial features), pose, or other characteristics like hairstyle, piercings, scars, or tattoos. The facial segmentation data may include color information received from video frames and facial regions detected in the video frames (e.g., if a user moves around in the video recording such that only half of the face is in view or only the forehead is in view, etc.).

In some example embodiments, facial segmentation may include techniques for identifying edges of features (e.g., edge detection), regions of a face (e.g., region detection), and/or shapes of the head, face, or features (e.g., shape detection). The facial segmentation data may further include information related to the edge detection, region detection, and/or shape detection. For example, the facial segmentation data may include numerical information related to distances and sizes of features, shapes of features (e.g., oval faces, heart-shaped lips, etc.), depths of features (e.g., as recorded using 360-degree cameras, multiple cameras located at different angles around the user, map-based systems, and the like). In alternative example embodiments, the facial segmentation data may include full body segmentation data, such as body features or body elements determined according to similar methods (e.g., limbs, torso, body movement, etc.). Further example embodiments of the facial segmentation data may include data related to movement of the facials features. For example, the facial segmentation data may include shapes formed by the movement of one or more facial features.

An edge detection unit 214 may be configured to track and/or locate edge points of the segmented features using an edge detection module, to determine the locations of the left and right side of the lips and both eyes. Such edge detection may be used to further align speech signals from the video with audio signals from the audio recording.

After facial segmentation is performed and edge detection processing is completed or updated, a sampling unit 216 may be configured to use the segmented eye features and/or lip features recorded during different audio layovers may provide a more robust model of a user's facial recognition. The sampling unit 216 may use random samplings or specified number of samplings in order to perform the samplings. For example, the system may automatically, or a user may manually, determine a number of segments to track, e.g., six points on a list of features will be tracked, and the frames of a video corresponding to the segments are synchronized with a corresponding audio signal, e.g., based at least in part on a time stamp.

Further example embodiments include down sampling the data points that are created based on the edge detection in a manner that randomly selects points to be used in creating a model of the facial elements used for training the speech recognition program using both visual and auditory cues in combination. For example, as a person is recorded based on a video capture mechanism, the person may be recorded using up to 360 degrees of motion, such that random points from any angle may be detected and used as edge points. The edge points detected will include a large amount of visual data, such that mechanisms, such as the sampling unit 216, are used to determine a specified number of edge points to use for digitization. The 360-degree motion capture may include a 360-degree camera, such as a map-based system to enable depth detection, color-segmentation, and the capability to add additional features over features 1 and 2, such as body elements (e.g., hands, arms, feet, etc.). Example embodiments of a map-based system may include depth cameras for modeling in three dimensions, where the map-based system is configured to capture RGB images with per-pixel depth information. For example, an RGB-D camera may be a sensing camera system to capture 640×480 registered image and depth points at 30 frames per second. The frames of a video may provide visual and depth information that may be analyzed according to an algorithm (such as a joint optimization algorithm (in order to view shape information in three dimensions. The map-based system may further include a color segmentation module or system or may be operably interconnected with a color segmentation unit. The color segmentation may include segmenting colors of a frame of a video according to an algorithm, such as K-Means Clustering algorithms. The color segmentation may be configured to identify, isolate, label, and/or cluster groups of colors according to pixels or bitmap images in a frame in order to determine colors of an image or recording.

In further example embodiments, machine-learning algorithms may be utilized to optimize the features and points that are the most valuable dependent upon the circumstances, and the like. For example, different machine-learning algorithms and clustering algorithms may be manually or automatically implemented over the large amount of received visual data and used to determine the points to be down-sampled and used for digitization. Different types of algorithms may be considered, such as partially-labeled supervised learning algorithms, feature selection machine learning algorithms, model selection machine learning algorithms, and the like may be employed to determine which sets or subsets of features (e.g., distance between eyes, distance between lips and nose, location of eyes proportionally to scalp, and other facial feature distances) are possibly useful for determining clusters and which sets or subsets of feature points are actually useful for determining clusters.

Another example metric to collect for machine-learning usage may include the number of points chosen during the real-time learning session to include in the digitization. Facial points and other body measurements may further be utilized to optimize a clustering algorithm or points used in the clustering algorithm. Machine-learning algorithms may further be implemented to determine what features appear to be more important or useful in characterizing the random sampling of facial points used to model the lips for lip-synch learning.

A digitization unit 218 may be employed for digitizing or digitization, which may include the representation of an object, image, sound, document or a signal (usually an analog signal) by a discrete set of its sample points. The result may be a digital representation or a digital image, for the face or lip model of the user. The digitization unit may retain a log or database of the points remaining after the down-sampling of visual data, such that the digitization log includes only points and features used to model the user.

The filter tracking unit 220 may be a Kalman filter tracking unit, where a Kalman filter object is designed for tracking locations of video features over time in presence of noise. It can be used to predict a physical object's future location, to reduce noise in the detected location, or to help associate multiple physical objects with their corresponding tracks. A Kalman filter object can be configured for each physical object for multiple object tracking. To use the Kalman filter, the object is typically moving at constant velocity or constant acceleration. The Kalman filter algorithm involves two steps, prediction, and correction (also known as the update step). The first step uses previous states to predict the current state. The second step uses the current measurement, such as object location, to correct the state. The Kalman filter implements a discrete time, linear State-Space System. Both feature 1 (lip information) and feature 2 (eye information) are provided as output. Movement of other body parts (hands, eyebrows, head, etc.) might be used instead or in addition to eyes and lips.

In example embodiments of the filter tracking unit 220, the tracking may include predicting a path, along the track path, in order to compensate or attempt to compensate for missing or flawed data in the path (e.g., missing audio). The curve created by tracking missing elements may be used to determine possible missing points and the time stamp related to those missing points. The output of such prediction modeling may be provided to a machine-learning algorithm in order to determine the audio and video signal overlay. The audio and video signal overlay may create overlay data; for example, when a video signal and an audio signal are synchronized according to timestamp data they may be considered to be overlaid. The overlay data may include the synchronization data (e.g., corresponding time stamps of the video and the audio signals).

Figure 3:
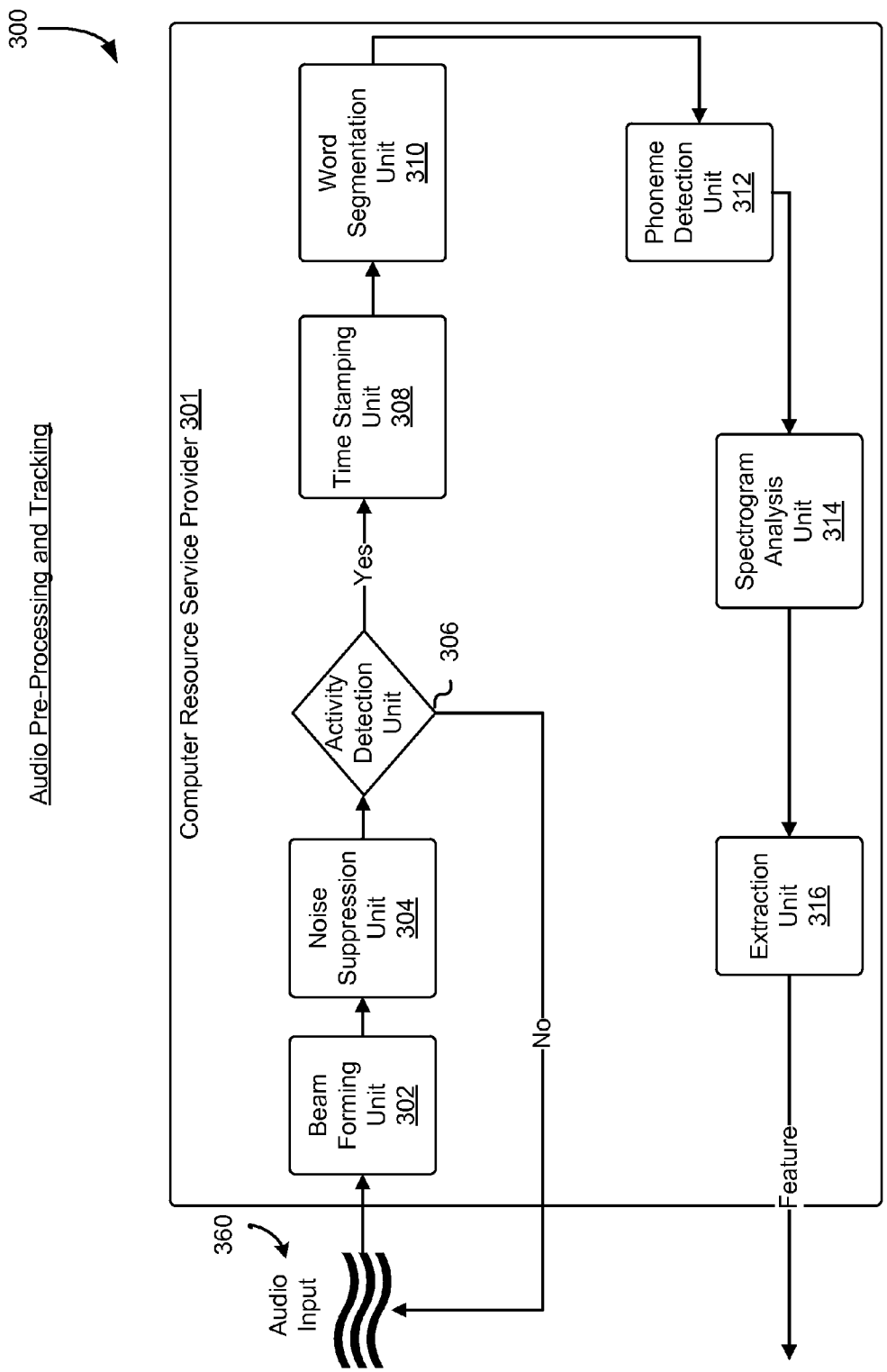
FIG. 3 is an illustrative example of a block diagram illustrating audio pre-processing and tracking in which various embodiments can be implemented.

FIG. 3 is an illustrative example of a block diagram 300 illustrating audio pre-processing and tracking in which various embodiments can be implemented. As illustrated in FIG. 3, the computing resource service provider (301) may include a beam forming unit (302), a noise suppression unit (304), an activity detection unit (306), a time stamping unit (308), a word segmentation unit (310), a phoneme detection unit (312), a spectrogram analysis unit (314), and an extraction unit (316).

In some example embodiments, once the edge detection and random sampling of audio and video recording are completed, a voice segment (from the corresponding audio recording) is verified as being a valid voice segment, a time stamp for the audio recording is provided by a management unit (not shown). A segmentation analysis is then performed. For example, a user may recite: "Hi, hello, how are you?" The audio analysis, being performed by a computer process or computer system component, may be completed using form detection (based at least in part on the segmentation) and/or spectrum analysis (e.g., for volume, analyze how frequency distribution matches). Based on the audio analysis, the video recording (e.g., video and/or image capture) would be segmented and analyzed, by the same or different computing process and/or computer system, to match and label specific facial movements with specific, corresponding phonemes. For example, specific audio and video segments, when aligned according to at least the respective time stamps, may be labeled such that a specific phoneme or phonemes are identified as corresponding to a specific image.

The example embodiment of FIG. 3 illustrates the beam-forming unit 302 receiving audio input and being configured to apply beamforming to the audio of the speaker speaking the sequence of words to form a beamformed audio signal. Based at least in part on the beamformed audio signal, a noise suppression unit 304 may be configured to apply noise suppression to the beamformed audio signal to form a revised beamformed audio signal. An activity detection unit 306 may be configured to determine that the revised beamformed audio signal includes representations of speaker activity. Further example embodiments may include parsing the revised beamformed audio signal into a word-segmented audio signal and parsing the word-segmented audio signal into a phoneme-segmented audio signal.

Example embodiments may include a speech recognition system using beamforming techniques to improve the speech recognition. Beamforming methods may include having more than one speech channels (e.g., microphones) used to process the speech, where the speech signals are received simultaneously by all microphones and outputs of these sensors are then processed to estimate and clean speech. Example embodiments may include targeting concrete desired spatial directions of a user while others are rejected. For example, a reliable speaker position estimation (e.g., the location of the user inside a video frame) may be used in order to correctly steer or move a beamformer towards the position of interest, or to change the position of the audio signal. Beamforming takes into account the fact that signals moving toward microphones will travel different distances to each of the microphones or other sensors. For example, example embodiments include selecting the spacing between the microphones (or providing the user with the requested spacing so as the user could move their own microphones) and the processor can delay the microphones' signals in order to create an interference pattern in which the majority of the audio signal energy travels out in one angular direction.

In example embodiments, the audio signal may be parsed and transformed into a word-segmented audio signal. The word-segmented audio signal, for example, may include word segmentation being performed by a computing resource service provider or component thereof, such as computing resource service provider 301 as described and depicted in connection with FIG. 3. The word segmentation may include identifying boundaries between words, syllables, and/or phonemes in a spoken natural language. While English is used within the description, any natural spoken language may apply and the word-segmentation may be used by both humans and machines (e.g., artificial processes of natural language processing) in order to perform word-segmentation requested or required according to the speech recognition system described herein. Word segmentation of audio signal, such as a beamformed or revised beamformed audio signal, may include determining a context of the audio signal (e.g., the words being used in a sentence), the grammar used, and the semantics used for the audio signal.

The word-segmented audio signal may then be parsed into a phoneme-segmented audio signal. The phoneme-segmented audio signal, for example, may include phoneme segmentation being performed by a computing resource service provider or component thereof, such as computing resource service provider 301 as described and depicted in connection with FIG. 3.

Once the audio is parsed into word-segmented audio, it is further parsed into a phoneme-segmented audio signal. Every word is comprised of phonemes. There are approximately 40 phonemes, or sound units or distinct units of sound, in the English language, at least as far as English used in the United States. A phoneme is a unit of sound in speech. A phoneme does not have any inherent meaning by itself, but when it is combined with other phonemes, the combination creates words. Words, either written or audible, may be segmented or broken apart to recognize the sounds or phonemes in that word. Phoneme segmentation is the ability to break words down into individual sounds; for example, the systems or modules receive the audio signal and/or the word-segmented audio signal, divides the words into its component sounds (e.g., the word "run" is divided into "r," "u," and "n"). The phoneme-segmentation process includes the system dividing a spoken word into its component sound(s) and selecting the letter(s) that represent or best represent the sounds.

For example, an image segment may be labeled as corresponding to the word "Hi." That segment is further analyzed and/or labeled as corresponding to the phonemes "huh" and "I." The labeling would identify the specific image as being comprised of two features (i.e., "huh" and "I"), such that the system may store the features, image segment, facial cues, and phonemes of that user as being associated with the word "Hi." The features, i.e., the feature 1 frame being the image capture/video corresponding with the phoneme "huh" and the feature 2 frame being the image capture/video corresponding to the phoneme "I"), along with the corresponding audio feature associated with the word "Hi," may be used to perform/determine a phoneme model. Example embodiments of a phoneme model may provide or be included in a template for that user; where the template may be continuously updated in order to further train the speech recognition system.

Such templates would further be useful for tracking and maintaining, in accordance with the embodiments presented herein, different dialects, different accents, different ages of users in order to continuously learn more about each user as their voice and facial elements change over years and geographical locations.

By employing spectrogram analysis, at a spectrogram analysis unit 314, the system may determine if a particular phoneme is a fricative or a consonant, for example. This enables the system to determine that a particular phoneme corresponds to a specific spectrogram in a certain portion of an audio/visual model.

The extraction unit 316 may provide the information to extract mel-frequency cepstral coefficient (MFCC) features. For example, in sound processing, the mel-frequency cepstrum (MFC) is a representation of the short-term power spectrum of a sound, based on a linear cosine transform of a log power spectrum on a nonlinear mel scale of frequency, where MFCCs are coefficients that collectively make up an MFC.

MFCCs are derived from a type of cepstral representation of the audio clip (a nonlinear "spectrum-of-a-spectrum"). The difference between the cepstrum and the mel-frequency cepstrum is that in the MFC, the frequency bands are equally spaced on the mel scale, which approximates the human auditory system's response more closely than the linearly-spaced frequency bands used in the normal cepstrum. This frequency warping can allow for better representation of sound, for example, in audio compression.

Figure 4:
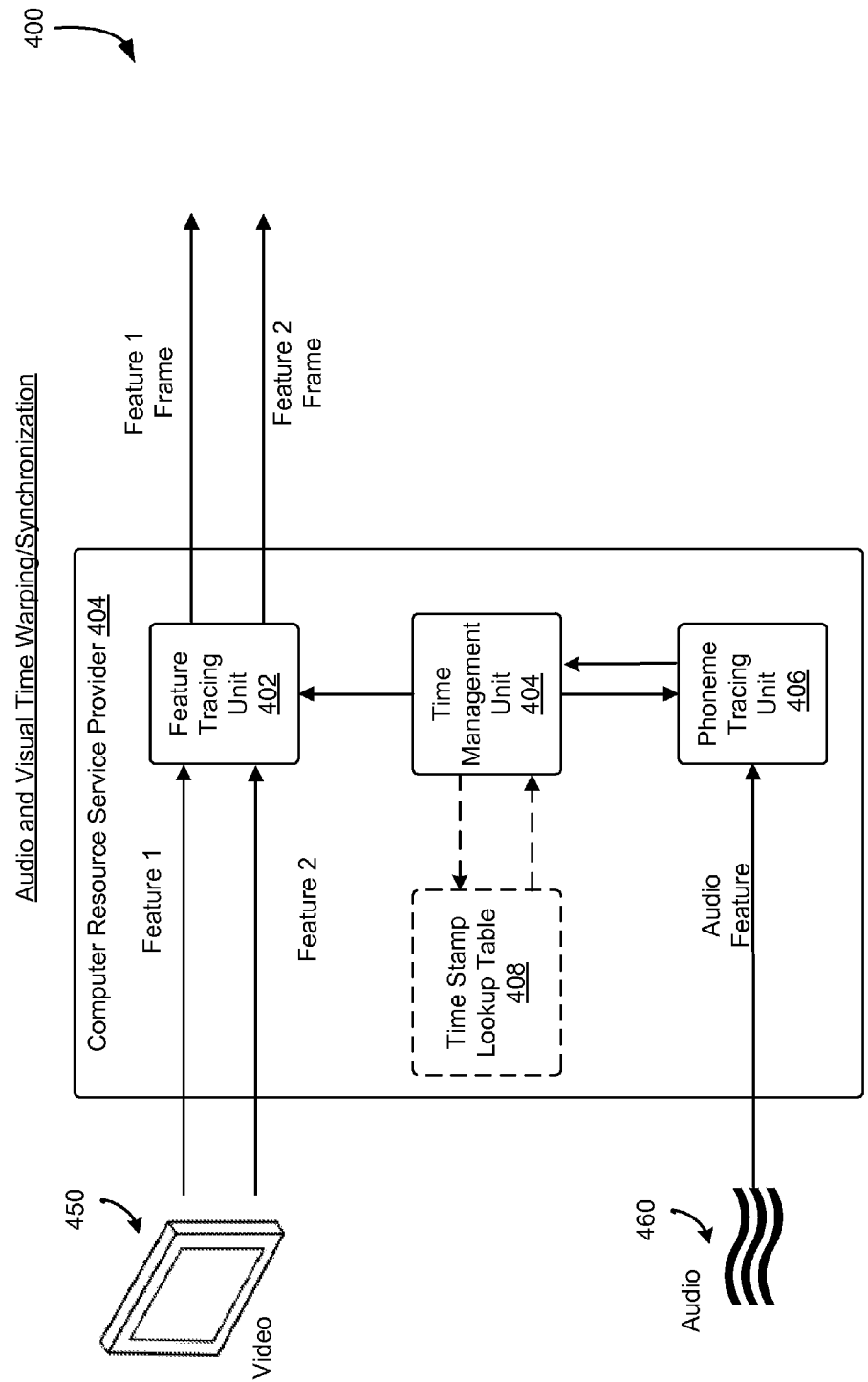
FIG. 4 is an illustrative example of a block diagram illustrating audio and visual time warping and synchronization in accordance with at least one embodiment.

FIG. 4 is an illustrative example of a block diagram 400 illustrating audio and visual time warping and synchronization in accordance with at least one embodiment. As illustrated in FIG. 4, the computing resource service provider 410 may include an audio and visual time warping/synchronization system, a feature tracing unit 402, a time management unit 404, a time stamp lookup table 408, and a phoneme tracing unit 406.

FIG. 4 implements an audio/visual time warping and synchronization mechanism that combines data, video feature 1 and video feature 2, retrieved from the video capture mechanism as described and depicted in connection with FIG. 2, and data, audio feature, retrieved from an audio capture mechanism as described and depicted in connection with FIG. 3. The audio/visual time warping and synchronization is used to form feature 1 frame and a feature 2 frame, the frames being a combination of audio and visual points to form a model for the speech learning program.

Audio capture 460 provides the audio feature (e.g., sound recording of a user) to a phoneme tracing unit 406. The phoneme tracing unit detects audio input received from an external source or processor and is used to maintain data or metadata related to the audio recording. For example, the phoneme-tracing unit may retrieve time stamp information to provide to other components. Time stamp information (also referred to as time code information) may include characters and/or encoded information identifying a date and/or time when events have occurred. The time stamp information may further include numeric codes (e.g., the time stamp) generated at regular or irregular intervals by a timing synchronization system, such as the time management unit 404. Example embodiments of time stamp information may include logging information identifying information related to audio and/or video recordings, such as a start time, an end time, a time bookmarked as important or special, a number identifying a specific frame of a video, a time a file was created, modified, and/or stored in the recording device, or a time a file was created, modified, and/or stored on a processing device.

The phoneme tracing unit further acts as a trigger for the time management unit 404 to transmit a signal to the time management unit that an audio signal has been detected. Recording audio and/or video signals may include recording from a same start time and/or recording according to an algorithm for managing time discrepancies between audio and video signals when recorded on separate devices. During a processing stage, after the audio and video signals have been captured and recorded, respectively, different mediums may require or need stages or time stamps to be associated with time locations in order to properly align the start time of the audio signal with the start time of the video signal. It should be noted that while a start time is used in example embodiments, any time throughout an audio and/or video recording may be used as a time to tag and/or align between the two signals. In some example embodiments, multiple time stamps may be used in order to properly align audio signals/data and video signals/data. For example, audio time stamps may be configured according to frame length; such as a frame length of 20 milliseconds, 10 milliseconds, 8 milliseconds, etc.

The time management unit is further configured to retrieve data related to time stamps of both audio and visual input. For example, the time management unit may transmit requests to the time stamp lookup table 408 in order to locate metadata related to specific audio input and metadata related to specific video input, in order to use the data as part of the feature tracing unit 402. The time stamp lookup table 408 is further configured to receive new time stamp information and maintain previously received time stamp information related to different audio and visual inputs.

The feature-tracing unit 402 is configured to receive the audio input information, including a time stamp and receive, from a video input processor 450, video input information. The video input information, as depicted in FIG. 4, includes feature 1 information and feature 2 information, including time stamps related to the visual input. The visual input time stamp is aligned with the audio input time stamp, such that the feature-tracing unit 402 may overlap the two inputs to produce feature 1 frame and feature 2 frame information.

In some example embodiments, after the video data and/or audio data (e.g., data related to the video or audio, such as metadata, or audio signals, or video signals) is received or recorded, and prior to performing speech-recognition processes, a module or component of the computing resource service provider 404 may be configured to perform a fidelity check or a validity check of the audio and/or video signals in order to determine and/or verify that the audio and video signals are of satisfactory quality. For example, if audio signals are received and the voice is inaudible or background noise is overtaking the speech, the system may require and/or request a new audio signal be performed. The audio and video signals may include fidelity metadata to be compared to a predetermined threshold or a threshold determined in real-time or near real-time, where the threshold requires the signals be a high enough quality such that processing the signals as described herein may be performed effectively in order to improve speech-recognition. In some example embodiments, the threshold may be a scale or variable threshold depending, for example, on the amount of data for that user, previous speech-recognition training for that user.

Figure 5:
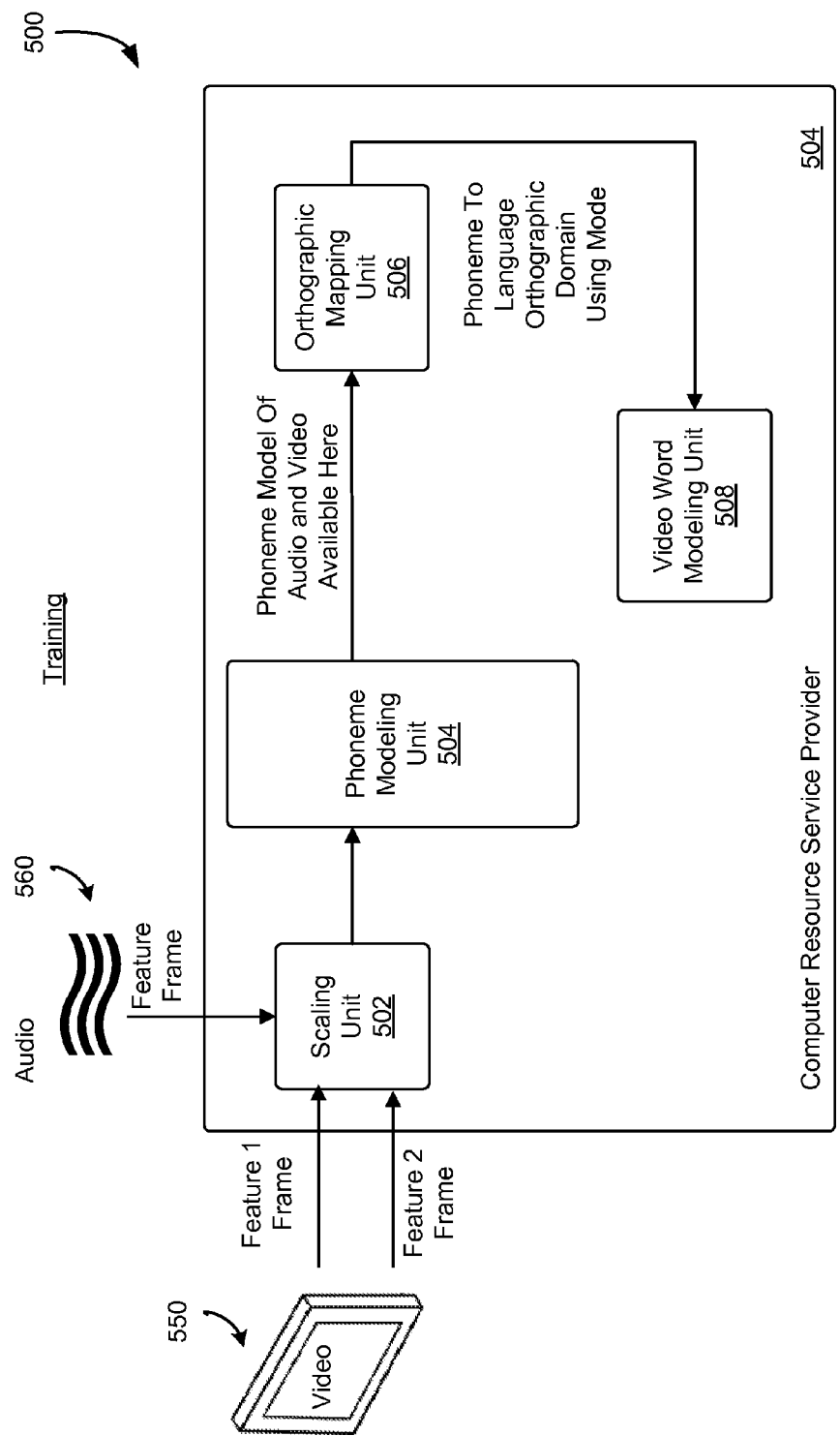
FIG. 5 is an illustrative example of a block diagram illustrating a training module in accordance with at least one embodiment.

FIG. 5 is an illustrative example of a block diagram 500 illustrating a training module in accordance with at least one embodiment. As illustrated in FIG. 5, the computing resource service provider (504) may include a scaling unit 502, a phoneme modeling unit 504, an orthographic mapping unit 506, and a video word modeling unit 508.

Example embodiments may include the scaling unit 502 configured to perform audio and/or visual scaling. The scaling unit may be a computer processor configured to adjust the audio and/or video inputs. For example, in order to build a phoneme model, the audio and/or video files may require time-based stretching and/or compression in order to successfully align the files.

The audio/video signal, once scaled (when necessary) is configured to provide the scaled input to a phoneme modeling unit 504. The phoneme modeling unit is configured to decipher different dialects and variations of words. The phoneme modeling unit 504 may use, for example, Hidden Markov Models (HMM), Deep Neural Networks (DNN) for Acoustic Modeling in Speech Recognition, dynamic time warping, and the like to perform phoneme modeling. After the modeling has been performed, the phoneme model of audio and video is made available to the orthographic mapping unit 506.

Once a phoneme model of the audio and the video is available, example embodiments of a system according to the disclosure may perform, at an orthographic mapping unit 506, an orthographic mapping of the given phoneme model. For example, the phoneme model available for the word "Hi," namely feature 1 "huh" and feature 2 "I," must be mapped to the corresponding word such that the orthographic map provides a phoneme to language orthographic domain for the word "Hi."

In alternative example embodiments, the training system may further include a video-word modeling module or word segmentation module. In example embodiments employing a video word modeling method may be useful for deciphering a difference between two or more similar sounding words. For example, a person may speak the phrase, "I am having lunch at noon." If the training scheme, e.g., the phoneme model or/and the orthographic model return the phrase, "I am having lunch at moon," the video word model could be used to convert back to the orthographic domain in order to determine the spoken word was "noon" and not "moon."

Figure 6:
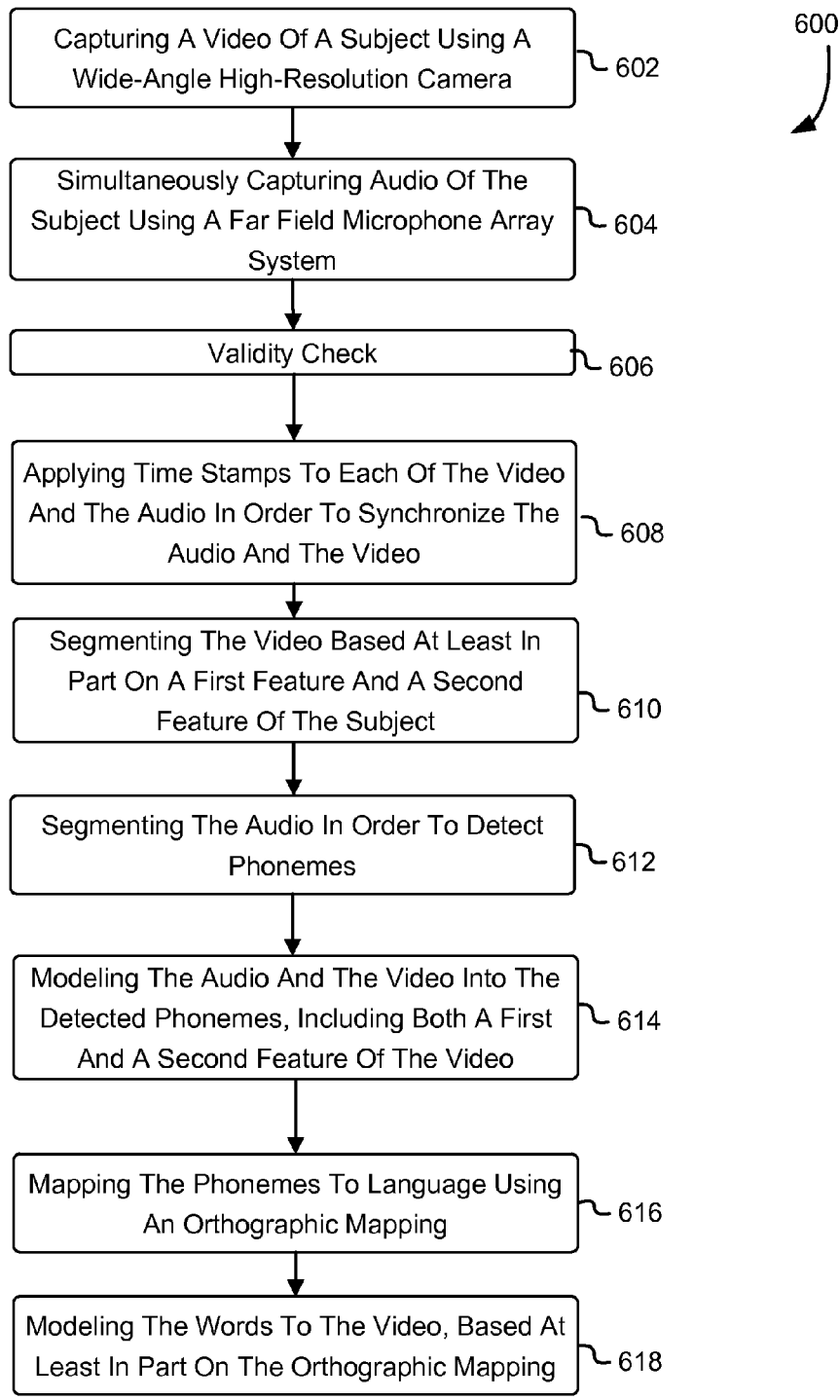
FIG. 6 is an illustrative example of a process for training a speech recognition program in real-time in accordance with at least one embodiment.

FIG. 6 is an illustrative example of a process 600 for teaching a speech-recognition system in real-time using video input and audio input in accordance with at least one embodiment. The process 600 may be performed by a server, computer, or other suitable component of the computer resource service provider as depicted and described in connection with FIG. 2.

As illustrated in FIG. 6, the process 600 may include a component, such as a server, of the computing resource service provider configured to capture a video of a subject using a wide-angle high-resolution camera (602). The server may simultaneously capture audio of the subject using a far field microphone array system (604). The server may apply time stamps to each of the video and the audio in order to synchronize the audio and the video (606).

The process 600 may further include segmenting, at the server, the video based at least in part on a first feature and a second feature of the subject (608). The server may further segment the audio in order to detect phonemes (610) and model the audio and the video into the detected phonemes, including both a first and a second feature of the video (612).

The modeling of the audio and/or the video into detected phonemes may include building or updating a model for each phoneme by using data collection from users speaking or uttering specific words/sentences. The model may perform user-specific training on a per-user basis, by detecting known phonemes, merging user-specific models with generic models for dialect variation, for example, and/or combining the user-specific model with general language model(s) for improved word accuracy.

Example embodiments of the process 600 may include, at the server, mapping the phonemes to language using an orthographic mapping (614) and modeling the words to the video, based at least in part on the orthographic mapping (616).

Some or all of the process 600 may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, or in the form of a computer program comprising a plurality of instructions executable by one or more processors. The computer-readable storage medium may be a non-transitory computer-readable storage medium.

Figure 7:
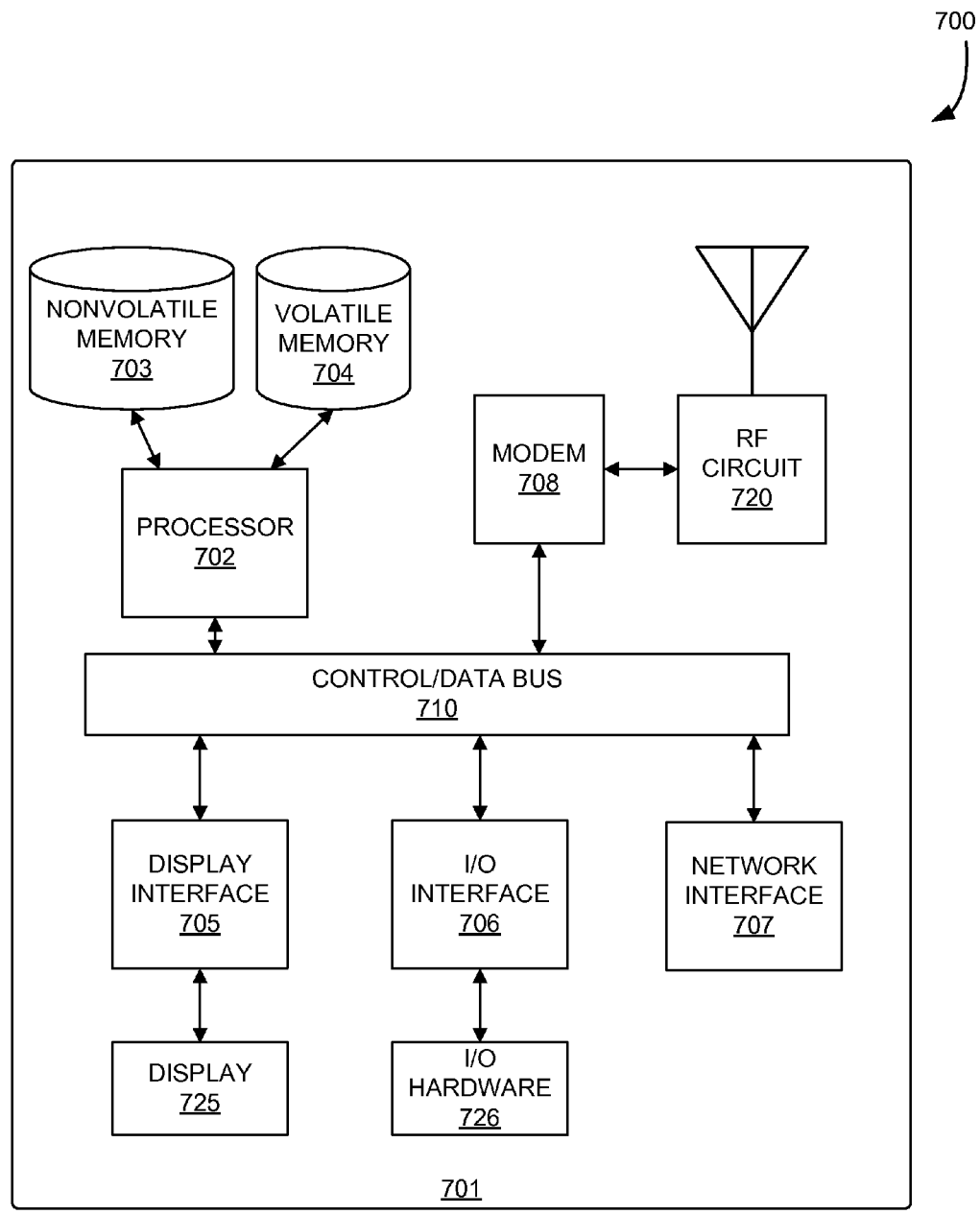
FIG. 7 is an illustrative example of an environment in accordance with at least one embodiment.

FIG. 7 is a block diagram of an example of computing hardware that might be used to implement methods and instantiate elements of audio and visual synchronization and processing for on-the-fly speech learning.

Computing hardware 701 in FIG. 7 is shown comprising a processor 702, non-volatile memory 703, volatile memory 704, a display interface 705, an input/output ("I/O") interface 706, a network interface 707, and a modem 708. Each of these components can communicate via a control/data bus 710. Modem 708 might facilitate wireless communications, via an RF circuit 720 and an antenna 722. Display interface 705 is coupled to a display 725 and "I/O" interface 706 is coupled to I/O hardware 726. Other elements, such as power supplies and power connections might be present although not shown. Examples of computing hardware for text processing might include dedicated computers, shared online computing services, or other methods of computation. Examples of electronic book reading devices might include a smartphone, tablet, reading device, or the like and might include other subsystems not shown in FIG. 7.

Processor 702 may be configured to access memory and execute computer-executable instructions loaded therein. For example, the processor 702 may be configured to execute computer-executable instructions of various program modules to cause or facilitate various operations to be performed in accordance with one or more embodiments of the disclosure. Processor 702 may include any suitable processing unit capable of accepting data as input, processing the input data in accordance with stored computer-executable instructions, and generating output data. Processor 702 may include any type of suitable processing unit including, but not limited to, a central processing unit, a microprocessor, a Reduced Instruction Set Computer ("RISC") microprocessor, a Complex Instruction Set Computer ("CISC") microprocessor, a microcontroller, an Application Specific Integrated Circuit ("ASIC"), a Field-Programmable Gate Array ("FPGA"), a System-on-a-Chip ("SoC"), a digital signal processor ("DSP"), and so forth. Further, processor 702 may have any suitable microarchitecture design that includes any number of constituent components such as, for example, registers, multiplexers, arithmetic logic units, cache controllers for controlling read/write operations to cache memory, branch predictors, or the like. The microarchitecture design of processor 702 may be capable of supporting any of a variety of instruction sets.

Non-volatile memory 703 may include read-only memory ("ROM"), flash memory, ferroelectric RAM ("FRAM"), various types of unalterable ROM, and/or writeable variants of ROM such as electrically erasable programmable read-only memory ("EEPROM"), and so forth. Non-volatile memory 703 may include removable storage and/or non-removable storage including, but not limited to, magnetic storage, optical disk storage, and/or tape storage. Non-volatile memory 703 may provide non-volatile storage of computer-executable instructions and other data. Non-volatile memory 703, removable and/or non-removable, is an example of computer-readable storage media ("CRSM") as that term is used herein.

Non-volatile memory 703 may store computer-executable code, instructions, or the like executable by processor 702 to cause processor 702 to perform or initiate various operations. Moreover, output data generated as a result of execution of the computer-executable instructions by processor 702 may be stored in non-volatile memory 703. Non-volatile memory 703 may store one or more operating systems ("O/S"), one or more database management systems ("DBMS"), and program modules, applications, or the like. Any of the program modules may include one or more sub-modules.

Volatile memory 704 may include random access memory ("RAM"), static random access memory ("SRAM"), various types of dynamic random access memory ("DRAM"), and so forth. Volatile memory 704 may include main memory as well as various forms of cache memory such as instruction cache(s), data cache(s), translation lookaside buffer(s) ("TLBs"), and so forth. Further, cache memory such as a data cache may be a multi-level cache organized as a hierarchy of one or more cache levels (L1, L2, etc.). Volatile memory 704 is an example of computer-readable storage media ("CRSM") as that term is used herein.

Network interface 707 might allow processor 702 to send and receive data from networked resources, such as servers, clients, devices, etc. that are able to communicate over cable networks, public networks (e.g., the Internet), private networks (e.g., frame-relay networks), wireless networks, cellular networks, telephone networks (e.g., a public switched telephone network), or any other suitable private or public packet-switched or circuit-switched networks. In addition, network interface 707 might be used for communication using associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial ("HFC") medium, a microwave medium, a radio frequency communication medium, a satellite communication medium, or any combination thereof.

Control/data bus 710 may include at least one of a system bus, a memory bus, an address bus, or a message bus, and may permit exchange of information between various components of the computing hardware 701. Control/data bus 710 may include, without limitation, a memory bus or a memory controller, a peripheral bus, an accelerated graphics port, and so forth. Control/data bus 710 may be associated with any suitable bus architecture including, without limitation, an Industry Standard Architecture ("ISA"), a Micro Type Architecture ("MCA"), an Enhanced ISA ("EISA"), a Video Electronics Standards Association ("VESA") architecture, an Accelerated Graphics Port ("AGP") architecture, a Peripheral Component Interconnects ("PCI") architecture, a PCI-Express architecture, a Universal Serial Bus ("USB") architecture, and so forth.

Figure 8:
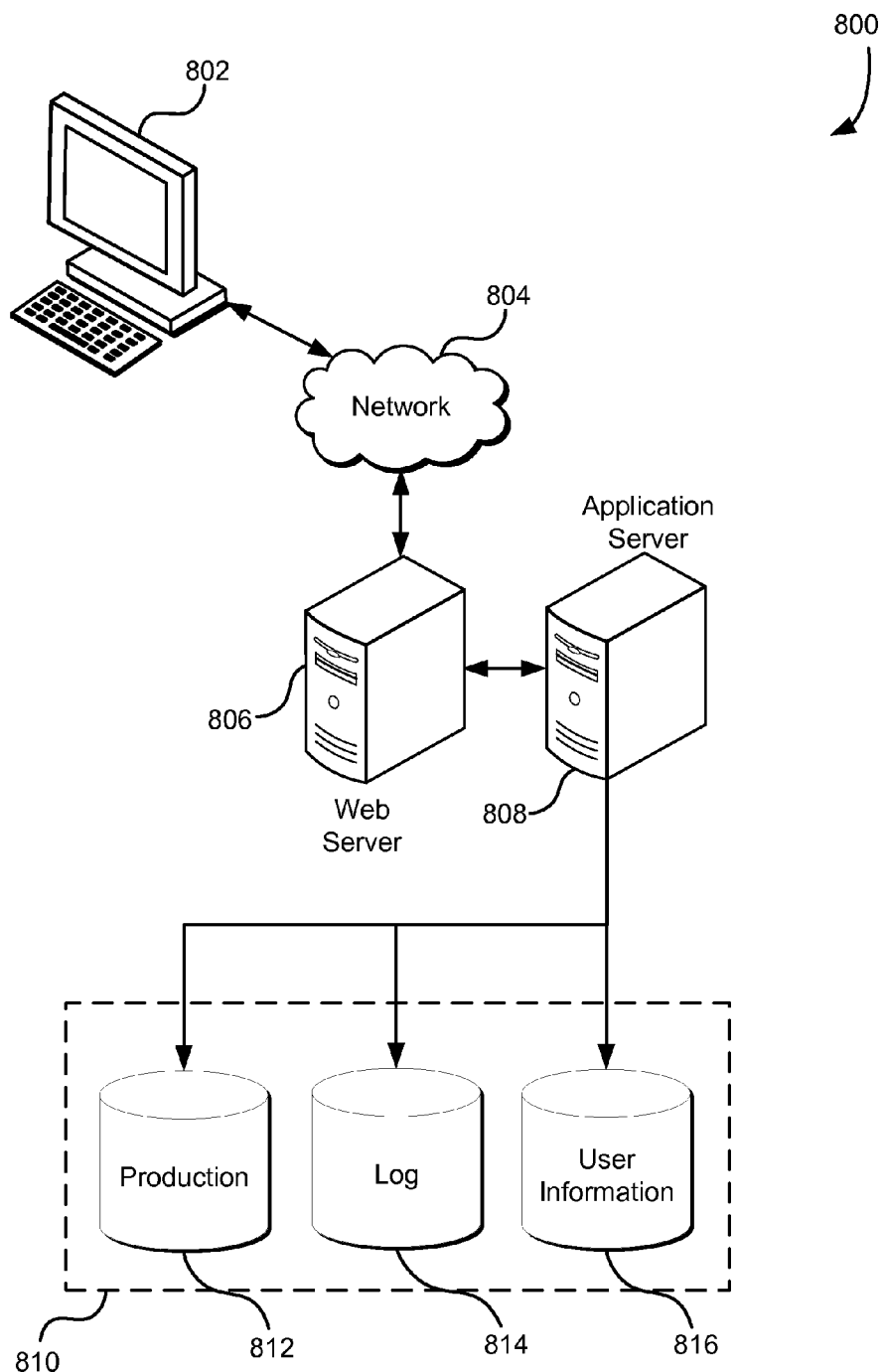
FIG. 8 illustrates an environment in which various embodiments can be implemented.

FIG. 8 illustrates aspects of an example environment 800 for implementing aspects in accordance with various embodiments. As will be appreciated, although a web-based environment is used for purposes of explanation, different environments may be used, as appropriate, to implement various embodiments. The environment includes an electronic client device 802, which can include any appropriate device operable to send and/or receive requests, messages, or information over an appropriate network 804 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the electronic client device 802 and the application server 808, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 810 can include several separate data tables, databases, data documents, dynamic data storage schemes and/or other data storage mechanisms and media for storing data relating to a particular aspect of the present disclosure. For example, the data store illustrated may include mechanisms for storing production data 812 and user information 816, which can be used to serve content for the production side. The data store also is shown to include a mechanism for storing log data 814, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. The application server 808 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the electronic client device 802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the example environment 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UPnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: $\{A\}$, $\{B\}$, $\{C\}$, $\{A, B\}$, $\{A, C\}$, $\{B, C\}$, $\{A, B, C\}$. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method for training a speech recognition computer system, comprising:
    under the control of one or more computer systems configured with executable instructions,
    receiving video data of a user speaking a sequence of words, the video data including first time stamp information, wherein the first time stamp information corresponds to a video recordation time indicative of a live time of the user speaking;
    receiving audio data of the user speaking the sequence of words, the audio data including second time stamp information, wherein the second time stamp information corresponds to an audio recordation time indicative of the live time of the user speaking;
    time synchronizing the video data and audio data based on the first time stamp information and the second time stamp information;
    segmenting the video data based, at least in part, on a first facial feature and a second facial feature of the user to determine facial segmentation data, wherein determining the facial segmentation data includes:
        a) identifying, from the video data, a first video frame that includes visual representations of an eye and lips of the user;
        b) determining, a first location of the eye in the first video frame and a second location of the lips in the first video frame;
        c) performing edge detection on the first and second locations to identify borders of the eye and the lips;
        d) generating a discrete set of sample bits corresponding to the first location of the eye and the second location of the lips in the first video frame; and
        e) creating a digital representation of the first facial feature and the second facial feature using the discrete set of sample bits
    segmenting the audio data, the segmenting including:
        a) parsing the audio data into word-segmented audio data; and
        b) parsing the word-segmented audio data into a phoneme-segmented audio data;
    overlaying the facial segmentation data, at a first time stamp of the video data, and the phoneme-segmented audio data, at a first time stamp of the audio data based at least in part on the time synchronizing; and
    updating a user-specific phoneme model for use in a speech recognition system, the phoneme model employing the overlaid facial segmentation data and phoneme-segmented audio data according to a machine-learning algorithm.

2. The computer-implemented method of claim 1, the method further comprising:
    downsampling the discrete set of sample bits to generate a set of downsampled bits;
    providing, for display, the digital representation of the first facial feature and the second facial feature using the downsampled bits;
    overlaying the digital representation of the first feature and the second feature based at least in part on the set of downsampled bits with the audio recording corresponding to the time stamps of the video recording;
    capturing movements of the digital representation of the first feature and the second feature corresponding to the audio recording; and
    updating the user-specific phoneme model based at least in part on the captured movements.

3. The computer-implemented method of claim 1, wherein determining shapes formed and/or movement created by the first facial feature, the second facial feature, the edges of the first facial feature, and/or the edges of the second facial feature further includes identifying numerical information related to at least one distance between the first facial feature and the second facial feature, wherein the at least one distance is used to create a model of movements made by the user.

4. A computing device comprising:
    memory storage for video and audio; and
    a processor coupled to the memory and configured to:
        a) identify a first frame of a video, wherein the first frame includes at least two facial features of a user and has an associated start recordation time and an end recordation time, wherein the start recordation time of the first frame and the end recordation time of the first frame correspond to video recordation times indicative of a live time of the user speaking;
        b) identify a first segment of an audio having an associated start recordation time and an end recordation time, wherein the first segment includes at least one distinct unit of sound in a specified language, wherein the start recordation time of the first segment and the end recordation time of the first segment correspond to audio recordation times indicative of the live time of the user speaking;
        c) align the start recordation time of the first frame with the start recordation time of the first segment;
        d) determine facial segmentation information from the at least two facial features in the first frame;
        e) determine audio segmentation information from the audio at the start recordation time of the first segment;

f) overlay the facial segmentation information with the audio segmentation information to generate overlay data;
g) update a phoneme profile that includes the generated overlay data;
h) perform edge detection of each of the at least two facial features to determine edge information, the edge detection being performed on bits/pixels of a bitmap image of the first frame of the video;
i) perform automated line-fitting on the at least two facial features, wherein the automated line-fitting includes downsampling the edge information or random sampling of the edge information; and
j) update the phoneme profile based at least in part on the automated line-fitting and/or the edge information.

5. The computing device of claim 4, wherein, based at least on the edge information, the processor is further configured to provide, for display, a digital representation of the least two facial features using the updated phoneme profile.

6. The computing device of claim 5, wherein the processor is further configured to use the edge information to track, over time, a physical location of the user captured in the first frame of the video.

7. A computing device comprising:
memory storage for video and audio;
a processor coupled to the memory and configured to:
a) identify a first frame of a video, wherein the first frame includes at least two facial features of a user and has an associated start recordation time and an end recordation time, wherein the start recordation time of the first frame and the end recordation time of the first frame correspond to video recordation times indicative of a live time of the user speaking;
b) identify a first segment of an audio having an associated start recordation time and an end recordation time, wherein the first segment includes at least one distinct unit of sound in a specified language, wherein the start recordation time of the first segment and the end recordation time of the first segment correspond to audio recordation times indicative of the live time of the user speaking;
c) align the start recordation time of the first frame with the start recordation time of the first segment;
d) determine facial segmentation information from the at least two facial features in the first frame;
e) determine audio segmentation information from the audio at the start recordation time of the first segment;
f) overlay the facial segmentation information with the audio segmentation information to generate overlay data; and
g) update a phoneme profile that includes the generated overlay data;
a first camera configured to capture video of the user from a first angle and output a corresponding first video signal;
a second camera configured to capture video of the user from a second angle and output a corresponding second video signal;
a first microphone configured to obtain a first audio signal from a first angle; and
a second microphone configured to obtain a second audio signal from a second angle;
wherein the processor is further configured to:
h) determine variability of recording times among the first camera, the second camera, the first microphone, and the second microphone; and
i) analyze the video and the audio, based at least in part on the variability of the recording times, to identify recordation times of the first video signal, the second video signal, the first audio signal, and the second audio signal.

8. The computing device of claim 7, wherein at least one of the first camera or the second camera is a 360-degree camera configured to use a map-based system that enables depth detection and/or color segmentation.

9. The computing device of claim 7, wherein the processor is further configured to generate a beamformed audio signal based at least in part the first audio signal and the second audio signal, wherein generating the beamformed audio signal further includes the processor being configured to:
j) determine a spacing between the first microphone and the second microphone; and
k) determine a delay between the first audio signal and the second audio signal.

10. The computing device of claim 9, wherein the processor is further configured to:
l) apply noise suppression to the beamformed audio signal to form a revised beamformed audio signal;
m) determine that the revised beamformed audio signal includes a valid voice signal, wherein the valid voice signal is above a predetermined fidelity determination;
n) parse the revised beamformed audio signal into a word-segmented audio signal;
o) parse the word-segmented audio signal into a phoneme-segmented audio signal;
p) perform spectrogram analysis on the phoneme-segmented audio signal to generate a mel-frequency cepstrum representation of the phoneme-segmented audio signal; and
q) derive mel-frequency cepstral coefficients of the mel-frequency cepstrum representation for use in aligning the phoneme-segmented audio signal with the facial segmentation information.

11. A computer-implemented method for automatic training a speech recognition computer system, the method comprising:
under the control of one or more computer systems configured with executable instructions,
receiving video data of a video recording of a user appearing to speak a sequence of words, the video data including time stamp information associated with each frame;
receiving audio data of an audio recording of the user speaking the sequence of words, the audio data including time stamp information associated with each audio segment;
segmenting the audio recording, the segmenting including:
a) parsing the audio recording into word-segmented audio data;
b) parsing the word-segmented audio data into phoneme-segmented audio data; and
c) detecting a number of phonemes in the phoneme-segmented audio data;
synchronizing a time of the video recording with a time of the audio recording based at least in part of the time stamp of each audio segment and the time stamp of each frame;

clustering the video data and the audio data into a set of clusters based at least in part on the number of phonemes detected in the phoneme-segmented audio data;

identifying a total number of entries in each cluster of the set of clusters;

determining a probability estimation of phoneme classification for each cluster in the set of clusters;

comparing the probability estimation for each cluster of the set of clusters to a pre-selected phoneme model, wherein each cluster is determined, based at least in part on the probability estimation, to be associated with a certain phoneme; and updating a phoneme model for the user for use in the automatic training of a speech recognition system.

12. The computer-implemented method of claim 11, further comprising:

comparing the probability estimation for each cluster of the set of clusters to a pre-selected phoneme model, wherein each cluster is determined, based at least in part on the probability estimation, to be associated with a certain phoneme; and updating a phoneme model for the user for use in the automatic training of a speech recognition system.

13. The computer-implemented method of claim 12, further comprising:

determining body segmentation data from the video recording based at least in part on one or more body elements of the user captured in the video recording, wherein determining the body segmentation data includes:
a) detecting feature edges of the one or more body elements; and
b) determining shapes formed and/or movement created by the one or more body elements and the edges of the one or more body elements.

14. The computer-implemented method of claim 13, further comprising:

segmenting the video data based at least in part on the one or more body elements;

identifying, from the video, locations on video frames that correspond to the one or more body elements over a plurality of frames of the video;

performing edge detection on the locations on the video frames to identify borders of a body part of the user that moves as the user speaks;

determining a set of sample points corresponding to the borders of the body part;

downsampling the set of sample points to form a downsampled set of sample points; and identifying the one or more body elements with the downsampled set of sample points.

15. The computer-implemented method of claim 14, further comprising processing the downsampled set of sample points using a Kalman filter to track the locations over time.

16. The computer-implemented method of claim 15, further comprising:

obtaining a first video signal from a first camera at a first angle;

obtaining a second video signal from a second camera at a second angle;

obtaining a first audio signal from a first microphone at a first angle;

obtaining a second audio signal from a second microphone at a second angle; and analyzing the video and the audio to identify recordation times taking into account variability of recording times among the first camera, the second camera, the first microphone, and the second microphone.

17. The computer-implemented method of claim 15, further comprising:

utilizing a plurality of video frames for performing edge detection;

determining the set of sample points; and downsampling the set of sample points, such that the downsampled set of sample points corresponds to movements of body parts of the user over time.

18. The computer-implemented method of claim 11, further comprising:

comparing a first recordation time of a first user action with a first media time of the first user action, wherein the first recordation time indicates when the first user action occurred and wherein the first media time indicates a first time marking of first media having recorded thereon a first representation of the first user action;

comparing a second recordation time of a second user action with a second media time of the second user action, wherein the second recordation time indicates when the second user action occurred and wherein the second media time indicates a second time marking of second media having recorded thereon a second representation of the second user action;

scaling the video or the audio based on differences in comparing the first recordation time with the first media time and in comparing the second recordation time with the second media time; and aligning the video and the audio for use in modeling the audio and the video into a speech recognition model.

\* \* \* \* \*